United States Patent
Nagatsuma et al.

(10) Patent No.: US 6,388,613 B1
(45) Date of Patent: May 14, 2002

(54) PORTABLE GPS TYPE DISTANCE/SPEED METER CAPABLE OF SELECTIVELY USING DOPPLER SPEED MEASURING METHOD

(75) Inventors: Hideaki Nagatsuma; Kazumi Sakumoto; Hiroshi Odagiri, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/537,941

(22) Filed: Mar. 29, 2000

(30) Foreign Application Priority Data

Mar. 30, 1999 (JP) .......................................... 11-089678

(51) Int. Cl.⁷ ............................. H04B 7/185; G01S 5/02
(52) U.S. Cl. ...................... 342/357.08; 701/213; 482/8
(58) Field of Search .................... 342/357.08; 701/213; 482/8

(56) References Cited

U.S. PATENT DOCUMENTS

| | | | |
|---|---|---|---|
| 6,009,375 A | * 12/1999 | Sakumoto et al. | 701/216 |
| 6,013,007 A | * 1/2000 | Root et al. | 482/8 |
| 6,032,108 A | * 2/2000 | Seiple et al. | 702/97 |

* cited by examiner

Primary Examiner—Theodore M. Blum

(74) Attorney, Agent, or Firm—Adams & Wilks

(57) ABSTRACT

A portable type distance/speed meter is designed for measuring a travel distance and a travel speed when a user walks, or runs, while realizing a correct average speed calculation in response to GPS electromagnetic waves receiving conditions. The portable type distance/speed meter is arranged by: a GPS (Global Positioning System) receiver for receiving GPS electromagnetic waves transmitted from GPS satellites to acquire positioning data from the received GPS electromagnetic waves; first distance calculating means for calculating a travel distance of a user as a first distance based upon a difference between positional information contained in the positioning data which are acquired at two positions; timer means for measuring travel time of the user over the first distance; first speed calculating means for calculating a travel speed of the user as a first speed based upon both the first distance calculated by the first distance calculating means and the travel time measured by the timer means; abnormal value detecting means for detecting an abnormal value of the first speed calculated by the first speed calculating means; average speed calculating means for calculating an average travel speed of the user based upon the first speed calculated by the first speed calculating means in the case that the abnormal value of the first speed is not detected by the abnormal value detecting means; and distance accumulating means for accumulating the first distance calculated by the first distance calculating means so as to calculate an accumulated distance in the case that the abnormal value of the first speed is not detected by the abnormal value detecting means.

9 Claims, 6 Drawing Sheets

PORTABLE GPS TYPE DISTANCE/SPEED METER CAPABLE OF SELECTIVELY USING DOPPLER SPEED MEASURING METHOD

BACKGROUND OF THE INVENTION

1. Field of the Invention

The present invention generally relates to a portable GPS type distance/speed measuring apparatus. More specifically, the present invention is directed to a portable distance/speed meter capable of calculating/displaying both a travel distance and a travel speed based upon positioning data acquired by receiving GPS electromagnetic waves. Furthermore, the present invention is related to such a portable type distance/speed meter suitable for measuring a travel distance and a travel speed when a person having this portable meter who walks, or runs, while selectively using the Doppler speed measuring method.

2. Description of the Related Art

In the GPS (Global Positioning System), 24 sets of the GPS satellites orbit on 6 sets of orbit courses located at an inclined angle of 55 degrees at a distance of approximately 20,200 km on the earth, and travels for approximately 12 hours per one turn. While navigation data required for positioning, transmitted from more than 3 GPS satellites under the most receivable condition are received by a GPS receiver, positioning calculations are carried out by measuring propagation delay time of these navigation data so as to determine travel direction/present position of a user.

In this GPS, two different frequencies "L1 (=1.57542 GHz)" and "L2 (=1.22760 GHz)" are prepared for the transmission frequencies of the GPS satellites. Since the C/A code (namely commercial-purpose, code being free-opened) is transmitted at the frequency of 1.57542 GHz (equal to GPS transmission frequency "L1") one GPS transmission frequency "L1" is utilized in general-purpose positioning operation. It should be understood that the GPS signal having this frequency "L1" is modulated in the PSK (Phase Shift Keying) modulating method by using the pseudonoise code, and then the PSK-modulated GPS signal is transmitted by way of the spread spectrum communication system. This pseudonoise code corresponds to the synthesized wave made from the C/A code used to discriminate the desirable GPS satellite from all of the GPS satellites, and also the navigation data such as the GPS satellite orbit, the GPS satellite orbit information,, and the time information.

FIG. 6 is a schematic block diagram representing an arrangement of a GPS receiver 200 capable of receiving a GPS electromagnetic wave (namely, GPS signal having frequency of "L1 (=1.57542 GHz)") transmitted from a GPS satellite. As shown in FIG. 6, the GPS receiver 200 is arranged by a reception antenna 201, an L-band amplifying circuit 202, a down-converter circuit 203, a voltage comparing circuit 204, a message decrypting circuit 205, and a positioning calculating circuit 206. The reception antenna 201 receives GPS electromagnetic waves transmitted from the GPS satellites. The L-band amplifying circuit 202 amplifies a GPS signal having an L-band frequency among the received GPS signals. The down-converter circuit 203 performs a down converting operation of the amplified GPS signal by multiplying this received GPS signal by a signal produced from a local oscillating circuit 107. The voltage comparing circuit 204 digitally converts the GPS signal down-converted by the down-converter circuit 203 into a digital GPS signal. In the message decrypting circuit 205, the digital GPS signal inputted from the voltage comparing circuit 204 is multiplied by a C/A code generated from a C/A code generating circuit 208 so as to acquire both navigation data and carrier wave phase information corresponding to a pseudodistance. The positioning calculating circuit 206 calculates positioning data by using both the navigation data and the carrier wave phase information, which are entered from the message decrypting circuit 205. It should also be noted that the local oscillating circuit 107 corresponds to such a circuit capable of producing a signal used to convert a received GPS signal into another signal having a desirable frequency.

Next, reception operation of this GPS receiver 200 will now be described. In FIG. 6, the L-band amplifying circuit 202 selectively first amplifies the GPS signal having the frequency of 1.57542 GHz received by the reception antenna 201. The GPS signal amplified in the L-band amplifying circuit 202 is entered into the down-converter circuit 203. This down-converter circuit 203 converts this entered GPS signal into a first IF (intermediate frequency) signal having a frequency of from several tens of MHz to 200 MHz by using the local oscillation signal produced from the local oscillating circuit 107, and furthermore, converts this first IF signal into a second IF signal having a frequency on the order of from 2 MHz to 5 MHz. Then, the voltage comparing circuit 204 enters thereinto this second IF signal so as to digitally convert the second IF signal into the digital GPS signal by employing a clock signal having a frequency several times higher than the frequency of this entered second IF signal. In this circuit, this digitally-converted GPS signal will constitute spectrum-spread data (digital signal).

This spectrum-spread data outputted from the voltage comparing circuit 204 is entered into the message decrypting circuit 205. Then, this message decrypting circuit 205 reverse-spreads the C/A code produced from the C/A code generating circuit 208 to the entered digital signal so as to acquire both the navigation data and the carrier wave phase information corresponding to the pseudodistance. The C/A code implies the pseudonoise code identical to that of the GPS satellite.

The above-explained reception operation is carried out with respect to the respective GPS satellites in this GPS receiver 200. Normally, the message decrypting circuit 205 of the GPS receiver 200 may acquire the navigation data and also the carrier wave phase information of 4 sets of the GPS satellites, and then the positioning calculating circuit 206 acquires the positioning data (speed, present position, time information etc.) based upon the acquired navigation data/carrier wave phase information. The positioning data acquired by the positioning calculating circuit 206 is outputted to a CPU (not shown) for controlling the overall reception operation of this GPS receiver 200, or externally outputted as a digital signal.

As the method for calculating the travel distance of the main body of this GPS receiver 200 and the travel speed thereof by using the positioning data calculated by this positioning calculating circuit 206, there are known two typical calculating methods, namely the positional change calculating method and the Doppler speed calculating method. First, in this positional change calculating method, altitude/longitude information is acquired at two separate positions used to define a travel distance, and then the above-explained travel distance is calculated based upon a difference (subtraction) between two sets of the acquired altitude/longitude information. Thereafter, this calculated travel distance is divided by travel time measured by traveling the GPS receiver 200 over these two positions to thereby calculate a travel speed. However, this positional change calculating method has the following problem. That is, a so-called "positional jump" happens to occur due to the below-mentioned reasons, so that large errors are involved in the calculated travel distance as well as travel speed. Namely, the measuring precision of the positional information calculated from the normally-utilized GPS electromagnetic waves is not so high, and this positional information is likely to be adversely influenced by SA (Selective Availability) corresponding to one of the GPS positioning error factors.

On the other hand, in the Doppler speed calculating method, since the Doppler shift frequency is acquired from the positioning data, a relative speed is firstly calculated between each of the GPS satellites and the main body of the GPS receiver 200. Subsequently, a travel speed of the main body of this GPS receiver is calculated based on a difference between this calculated relative speed and a speed of each of these GPS satellites (especially, satellite speed along the direction of the GPS receiver 200) which is obtained from the navigation data (orbit information etc.) acquired in the message decrypting circuit 205. Thereafter, a travel distance of this main body of the GPS receiver 200 is calculated by multiplying this travel speed by the travel time. However, this Doppler speed calculating method has the following problem. That is, when the actual travel speed of the main body of this GPS receiver 200 is lowered, it is hard to immediately specify the travel direction of this GPS receiver 200. As a result, the ratio of the measuring error contained in the Doppler shift frequency is increased, so that large errors are also involved in the travel distance and the travel speed, which are finally calculated.

The GPS receiver with such an arrangement is described in, for instance, Japanese Patent Application Laid-Open No. Hei 8-36042 entitled "GPS RECEIVER AND SPEED DETERMINING MEANS USED THEREIN". Concretely speaking, this GPS receiver is provided with the speed calculating unit (corresponding to means for performing the above-described Doppler speed calculating method), and the travel speed calculating unit (corresponding to means for performing the above-explained positional change calculating method). The speed calculating unit measures the Doppler shift frequencies of the plural satellites and then calculates the speed of the GPS receiver based upon the simultaneous equations. The travel speed calculating unit calculates the speed from the travel amount of the positioning result. In response to the speed of the GPS receiver, a selection is made of any one of the speed calculating unit and the travel speed calculating unit to calculate the speed. Also, the speed calculated from the speed calculating unit is corrected by employing the speed calculated from the travel speed calculating unit.

In the above-described "GPS RECEIVER AND SPEED DETERMINING MEANS USED THEREIN", the Doppler speed calculating method and the positional change calculating method are selectively used so as to calculate the travel speed. However, since these calculating methods are properly selected based on the speed change, in such a case that a large error is involved in the speed itself (namely, judgement subject for speed change), the reliability of this selecting operation itself is lowered, the object such that the speed can be measured with high precision can not be achieved.

On the other hand, the above-explained GPS receivers are increasingly realized in the forms of such portable type distance/speed meters capable of measuring travel speeds/travel distances of persons, since these GPS receivers may be supplied as a digital ASIC (Application Specific IC) due to current technical progress in semiconductor fields. In the case that the above-described GPS receiver 200 is mounted on this portable type distance/speed meter, since a person walks, or runs at a relatively slow speed, it is preferable to employ the above-explained positional change calculating method as the speed calculating method thereof. However, in this case, there is a problem in the measuring error caused by the so-called "positional jump".

Furthermore, there are many possibilities that the above-explained GPS receiver 200 cannot receive the GPS electromagnetic waves, because the reception of these GPS electromagnetic waves is disturbed by various disturbing objects, d for example, bottom places among buildings and places inside tunnels, and/or when one GPS satellite captured by this GPS receiver 200 is switched to another GPS satellite. As a result, the GPS receiver 200 can hardly acquire the positioning data, which may cause another problem in addition to the above-explained problem related to the travel speed calculation aspect. Under such an unreceivable condition of the GPS electromagnetic waves, apparently both travel speeds and travel distances cannot be correctly acquired. This fact may cause a further problem in such a case that an average travel speed is calculated in the above-described portable type distance/speed meter. In other words, since the incorrect travel speed is involved in the calculation stage of such an average travel speed, the resulting average travel speed containing a large error is indicated to the user, and furthermore, the calculation results of the correct travel speed cannot be usefully reflected onto this calculation result of the average travel speed.

SUMMARY OF THE INVENTION

The present invention has been made to solve the above-explained conventional problems, and therefore, has an object to provide a portable type distance/speed meter capable of calculating a correct average travel speed in response to various reception conditions of GPS electromagnetic waves, and suitable for measurements of a travel distance and a travel speed when a user who uses this portable type distance/speed meter walks, or runs.

FIG. 1 is a principle diagram representing an overall arrangement of a portable type distance/speed meter according to a first aspect of the present invention. That is, to achieve the above-described objects, the portable type distance/speed meter shown in FIG. 1, according to the present invention, is comprised of: a GPS (Global Positioning System) receiver 10 for receiving GPS electromagnetic waves transmitted from GPS satellites to acquire positioning data from the received GPS electromagnetic waves; a first distance calculating means 11 for calculating a travel distance of a user as a first distance based upon a difference between positional information contained in the positioning data which are acquired at two positions; a timer means 13 for measuring travel time of the user over the first distance; a first speed calculating means 12 for calculating a travel speed of the user as a first speed based upon both the first distance calculated by the first distance calculating means 11 and the travel time measured by the timer means 13; an abnormal value detecting means 14 for detecting an abnormal value of the first speed calculated by the first speed calculating means 12; an average speed calculating means 16 for calculating an average travel speed of the user based upon the first speed calculated by the first speed calculating means 12 in the case that the abnormal value of the first speed is not detected by the abnormal value detecting means 14; and a distance accumulating means 15 for accumulating the first distance calculated by the first distance calculating means 11 so as to calculate an accumulated distance in the case that the abnormal value of the first speed is not detected by the abnormal value detecting means 14. Also, in addition to the above-described arrangement, the portable type distance/speed meter of the first aspect may be arranged by employing a display means 22 for displaying the average travel speed of the user calculated by the average speed calculating means 16 and the accumulated distance calculated by the distance accumulating means 15.

As a consequence, in accordance with the present invention, the travel distance and the travel speed of the user are calculated by way of the positional change calculating method in response to the GPS electromagnetic waves acquired by the GPS receiver 10. Only when the abnormal value detecting means 14 judges that the calculated travel speed is not such an abnormal travel speed, both the average travel speed and the accumulated distance are calculated by employing this travel speed and also this travel distance. As a consequence, in such a case that either a so-called "positional jump" or an unreceivable condition happens to occur while receiving the GPS electromagnetic waves, this abnormal travel speed and the travel distance corresponding to this abnormal travel speed can be excluded from the subject GPS data used to accumulate the travel distances and also to calculate the average travel speed.

Furthermore, FIG. 2 is a principle diagram indicating an entire arrangement of a portable type distance/speed meter according to a second aspect of the present invention. In FIG. 2, the portable type distance/speed meter of the second aspect is basically comprised of: the GPS receiver 10, the first distance calculating means 11, the first speed calculating means 12, and the abnormal value detecting means 14, as represented in FIG. 1. This portable type distance/speed meter of the second aspect is further comprised of: a second speed calculating means 19 for calculating a travel speed of the user as a second speed based upon Doppler shift frequency information contained in the positioning data acquired from the GPS receiver 10; a timer means 13 for measuring both travel time of the user over the first distance calculated by the first distance calculating means 11 and travel time of the user over the second speed calculated by the second speed calculating means 19; a second distance calculating means 20 for calculating a travel distance of the user as a second distance based upon both the second speed calculated by the second speed calculating means 19 and the travel time measured by the timer means 13; a speed selecting means 17 for selecting the first speed when the abnormal value of the first speed is not detected by the abnormal value detecting means 14, and for selecting the second speed when the abnormal value of the first speed is detected by said abnormal value detecting means 14; a distance selecting means 18 for selecting the first distance when the abnormal value of the first speed is not detected by the abnormal value detecting means 14, and for selecting the second distance when the abnormal value of the first speed is detected by the abnormal value detecting means 14; an average speed calculating means 16 for calculating an average travel speed of the user by employing any one of the first speed and the second speed selected by the speed selecting means 17; and a distance accumulating means 15 for calculating an accumulated distance by employing any one of the first distance and the second distance selected by the distance selecting means 18. Also, in addition to the above-described arrangement, the portable type distance/speed meter of the second aspect may be arranged by employing a display means 22 for displaying the average travel speed of the user calculated by the average speed calculating means 16 and the accumulated distance calculated by the distance accumulating means 15.

In accordance with the present invention, both the first distance and the first speed are calculated based upon the GPS electromagnetic waves transmitted from the GPS receiver 10 by way of the positional change calculating method, and furthermore, both the second distance and the second speed are calculated based on these GPS electromagnetic waves by way of the Doppler speed calculating method. In such a case that the abnormal value detecting means 14 judges that the calculated first speed is not the abnormal travel speed value, both the average travel speed and the accumulated distance of the user are calculated by employing the first distance and the first speed. To the contrary, when the abnormal value detecting means 14 judges that the calculated first speed is the abnormal travel speed value, both the average travel speed and the accumulated distance of the user are calculated by employing both the second distance and the second speed. As a result, in such a case that a so-called "positional jump" caused by the positional change calculating method happens to occur, the Doppler speed calculating method is employed so that this portable type distance/speed meter can continuously perform the precise GPS positioning operation.

Also, according to a third aspect of the present invention, there is provided a portable type distance/speed meter in which, in the portable type distance/speed meter according to the first aspect, or the second aspect, the abnormal value detecting means 14 can compare a present speed value of the first speed with a preceding speed value thereof, which are calculated by the first speed calculating means 12, and detect the first speed as the abnormal value in the case that the first speed corresponding to the present speed value is varied at a variation rate equal to or higher than a preselected variation rate with respect to the first speed corresponding to the preceding speed value.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to the attached drawings, various preferred embodiment modes of portable type distance/speed meters according to the present invention will be described more in detail. It should be understood that the present invention is not limited only to these embodiment modes.

Overall Arrangement of First Portable Type Distance/Speed Meter

Figure 3:
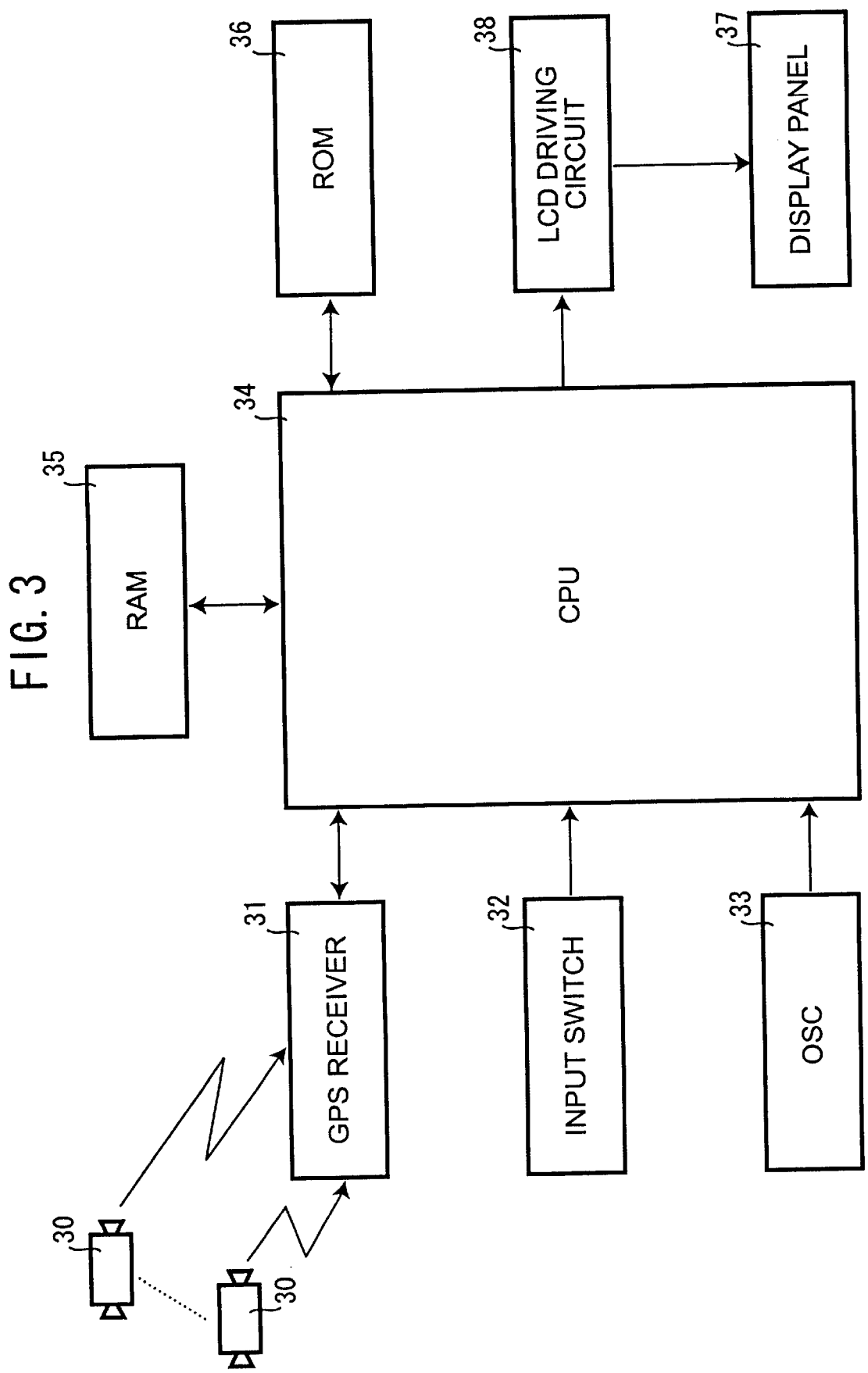
FIG. 3 is a schematic block diagram representing an arrangement of a portable type distance/speed meter according to an embodiment mode 1 of the present invention.
Figure 6:
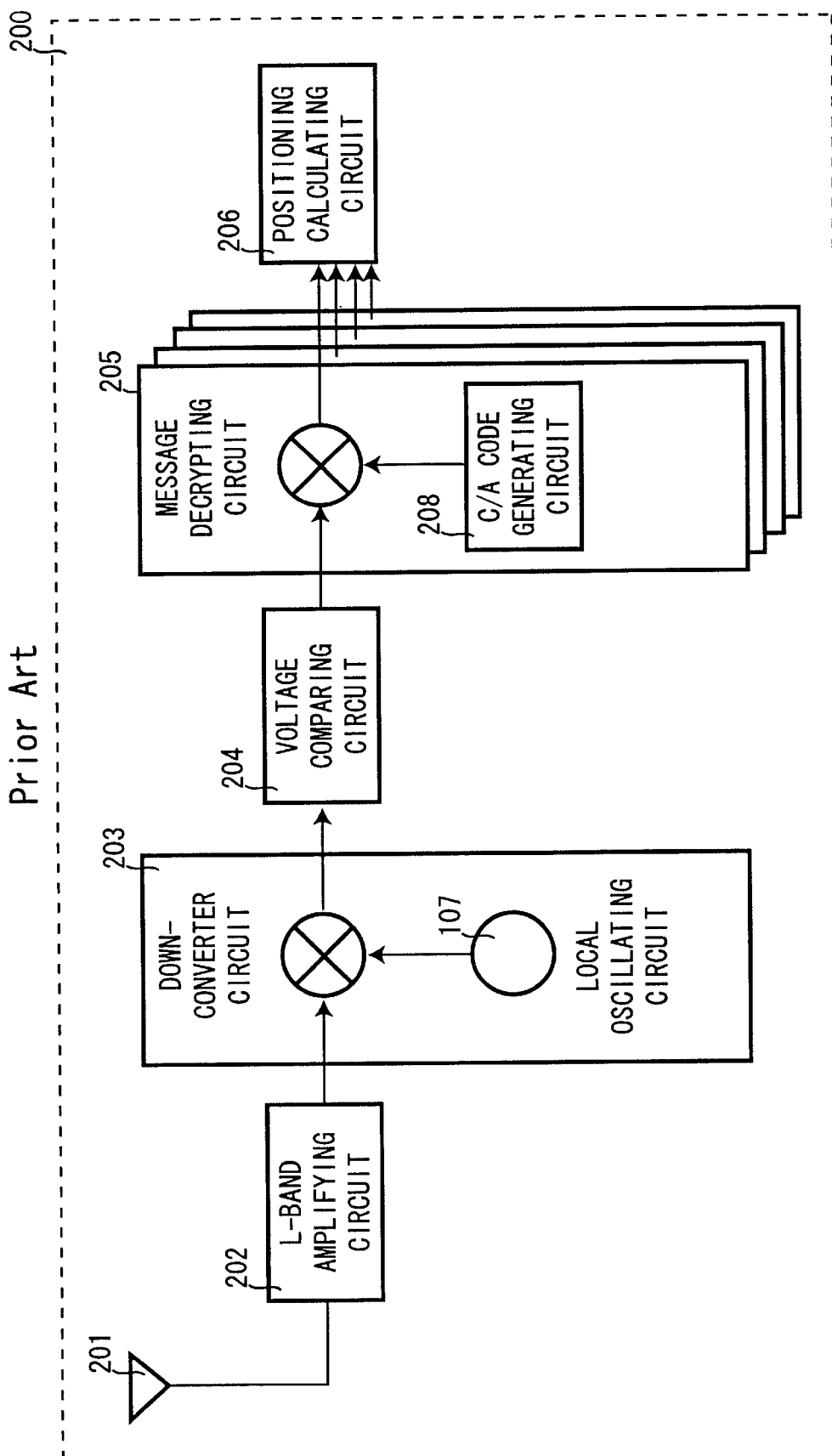
FIG. 6 is a schematic block diagram showing an arrangement of a conventional GPS receiver.

FIG. 3 is a schematic block diagram indicating an overall arrangement of a portable type distance/speed meter according to an embodiment mode 1 of the present invention. As indicated in this drawing, this first portable type distance/speed meter is arranged by employing a GPS receiver 31, a CPU 34, and an LCD driving circuit 38. The major arrangement of this GPS receiver 31 is indicated in FIG. 6. The GPS receiver 31 receives GPS electromagnetic waves transmitted from a plurality of GPS satellites 30 so as to measure present altitude and also present latitude. The CPU 34 executes various sorts of calculation process operations (will be discussed later) so as to calculate a reception ratio of GPS electromagnetic waves. The LCD driving circuit 38 controls a display panel 37 constructed of an LCD (Liquid Crystal Display) and the like so as to display the reception ratio calculated by the CPU 34 on this display panel 37.

The first portable type distance/speed meter is further arranged by using a ROM (read only memory) 36 for previously storing an operation program of the CPU 34, a RAM (random access memory) 35 utilized as a work area (user memory) of the CPU 34, an input switch 32 used to issue a starting instruction of a GPS signal reception, and an OSC (oscillating circuit) 33 for producing a reference frequency signal.

Operation of First Portable Type Distance/Speed Meter

Next, a description will now be made of operations of the first portable type distance/speed meter with employment of the above-explained arrangement.

Figure 4:
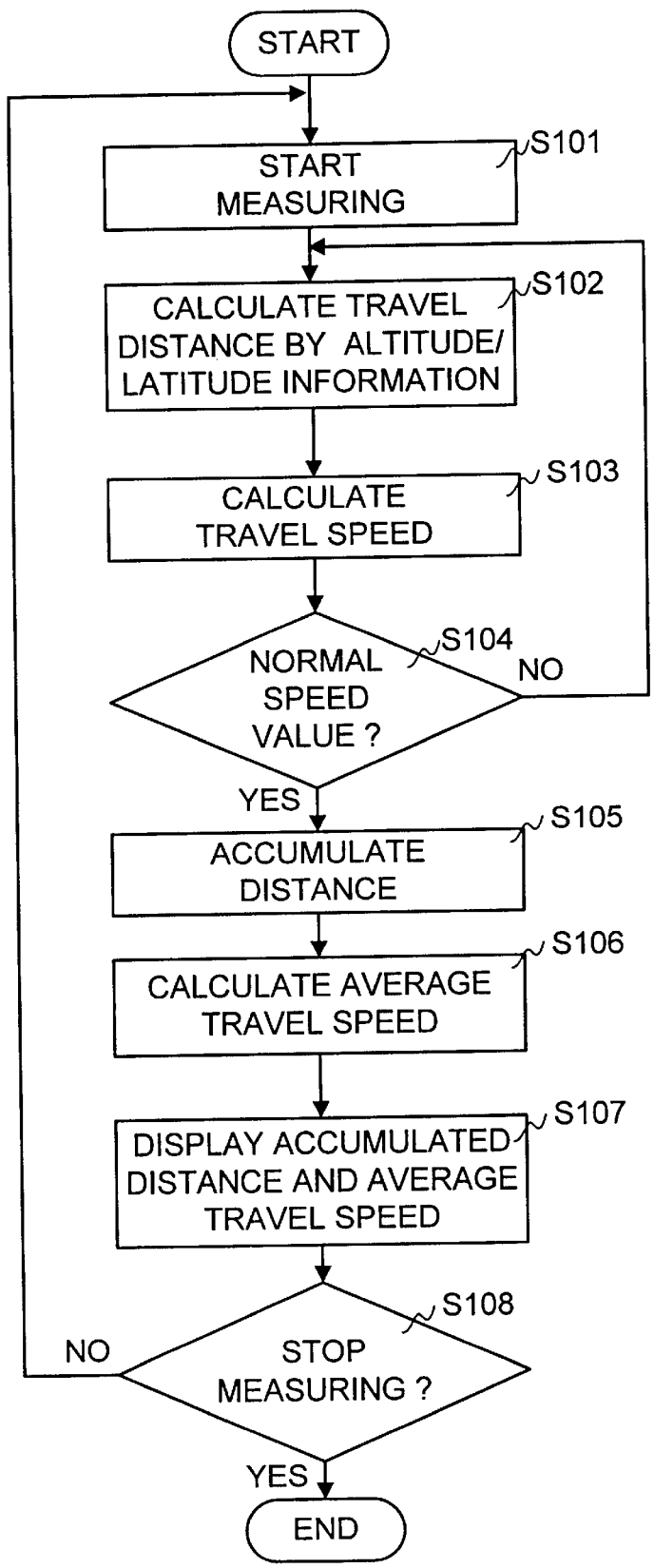
FIG. 4 is a flow chart describing operations of the portable type distance/speed meter according to the embodiment mode 1.

FIG. 4 is a flow chart describing the operations of this portable type distance/speed meter according to the embodiment mode 1. In this flow chart of FIG. 4, when the input switch 32 is firstly manipulated by a user, this first portable type distance/speed meter commences the measuring operations of a present travel speed and also of a travel distance of the portable type distance/speed meter (namely, user) at a step S101. That is, at the step S101, the GPS receiver 31 receives the GPS signals and acquires the positioning data in response to the GPS signals. In this case, the GPS reception implies such a process operation that the GPS electromagnetic waves are acquired within such a time period, with a sampling interval set to, for example, 1 second.

Figure 1:
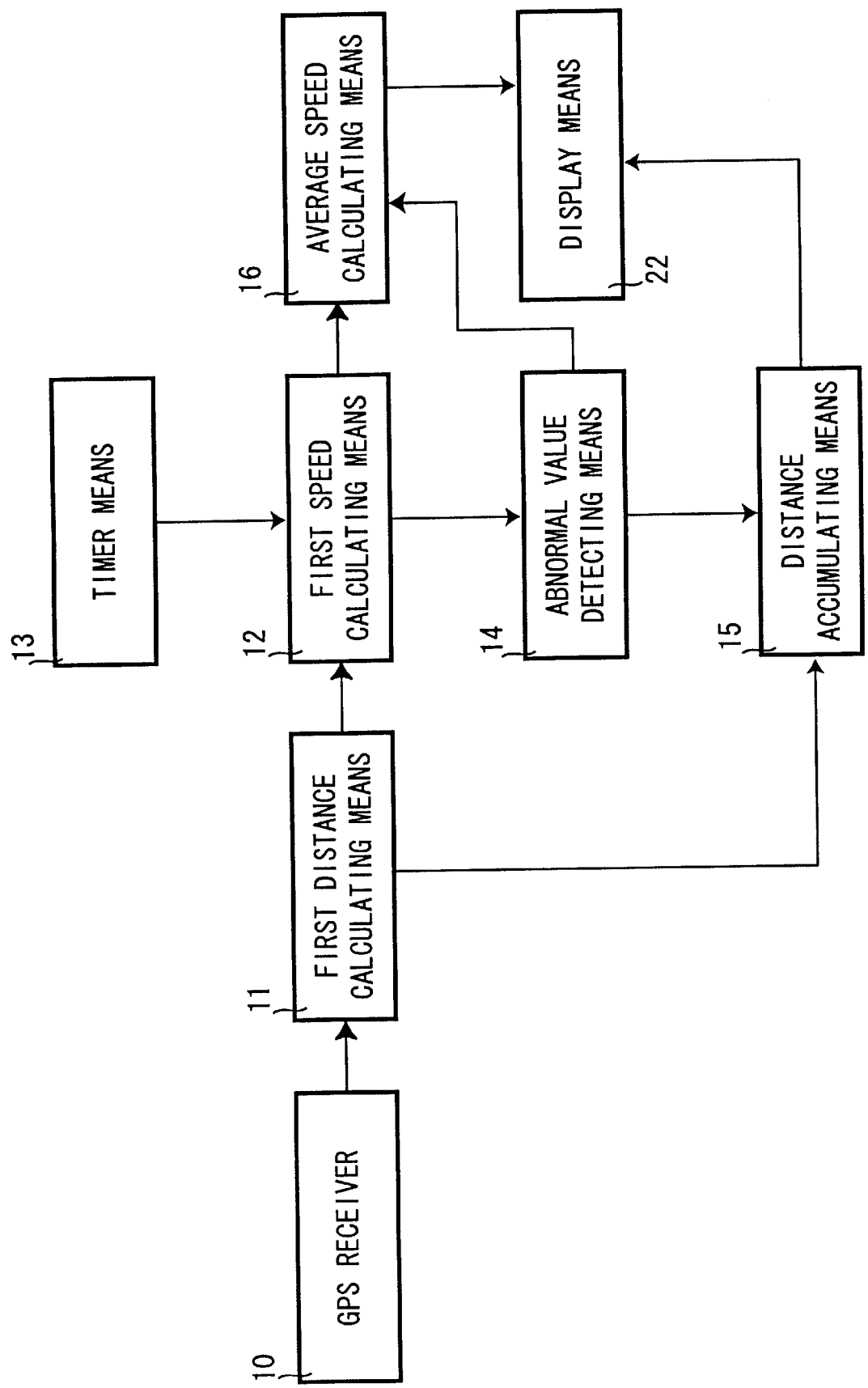
FIG. 1 is a block diagram schematically indicating a principle arrangement of one portable type distance/speed meter according to the present invention.

Next, under control of the CPU 34, present altitude/latitude information is extracted from the positioning data acquired at the previous step S101, and then, the extracted altitude/latitude information is saved in an altitude/latitude information storage unit (not shown) of the RAM 35. A storage area is provided in this altitude/latitude information storage unit in order to store the altitude/latitude information extracted at the previous step S102. The CPU 34 calculates a difference between the altitude/latitude information (namely, previously-acquired altitude/latitude information) previously stored in this storage area and presently-extracted altitude/latitude information. The calculation result is stored as a travel distance into a travel distance storage unit (not shown) of the RAM 35. It should be noted that this difference calculation may be carried out at timing determined by the above-explained sampling interval, or another set time interval by employing a timer counter corresponding to the timer means 13 shown in FIG. 1.

Subsequently, a travel speed is calculated by using the travel distance calculated at the step S102 under control of the CPU 34 (step S103). Concretely speaking, this travel speed is calculated by dividing the above-explained travel distance stored in the travel distance storage unit by the time interval at which the difference calculation is performed at the step S102, namely the travel time. That is, this step S103 corresponds to a process operation for calculating the travel speed in accordance with the above-explained positional change calculating method.

Next, the CPU 34 judges as to whether or not the travel speed calculated at the step S103 is the normal speed value (step S104). This judgment is executed in order to detect a so-called "positional jump", namely the problem related to the above-explained positional change calculating method. The CPU 34 performs the below-mentioned judging method. That is, while both the previously-calculated travel speed and the presently-calculated travel speed are saved in the travel speed storage unit (not shown) of the RAM 35 respectively at the step S103, the presently-calculated travel speed is compared with the previously-calculated travel speed by the CPU 34. In such a case that the presently-calculated travel speed indicates an unexpectable travel speed at which a person having this first portable type distance/speed meter can hardly walk, or can hardly run, the CPU 34 judges that the presently-calculated travel speed is brought into the abnormal speed state. In other words, the CPU 34 judges that a so-called "positional jump", or a GPS-signal unreceivable state happens to occur. For instance, when the presently-calculated travel speed becomes 3 times higher than the previously-calculated travel speed, the CPU 34 judges that this presently-calculated higher travel speed is brought into the abnormal speed state.

When the CPU 34 judges that the presently-calculated travel speed is the normal travel speed at the step S104, the CPU 34 accumulates the travel distance calculated at the step S102, and furthermore, updates the previously-calculated altitude/latitude information saved in the above-described altitude/latitude information storage unit by the presently-calculated altitude/latitude information extracted at the step S102 (step S105). It should be understood that the distance accumulating process operation is carried out as follows. That is, while an accumulated distance storage unit (not shown) of the RAM 35 is prepared, the travel distances calculated until the present travel distance is calculated are accumulated with each other, and this accumulated distance result is stored into the above-described accumulated distance storage unit.

Then, the CPU 34 calculates an average travel speed of the travel speeds calculated at the step S103 (step S106). At this step S106, concretely speaking, this average travel speed calculation is performed as follows. That is, the travel speed calculated at the step S103 during the present measuring operation is accumulated with respect to the travel speeds which have been previously calculated within a predetermined time period at the step S103. Thereafter, this accumulated speed result is divided by a total number of these accumulating operations.

Both the accumulated distance and the average travel speed calculated at the steps S105 and S106 are displayed on the display panel 37 under control of the CPU 34 via the LCD driving circuit 38 (step S107). After this display process operation at the step S107, the CPU 34 judges as to whether or not the user manipulates the input switch 32 to instruct a completion of this GPS data measuring operation (step S108). At the step S108, when the completion of this GPS data measuring operation is instructed, a series of the above-described process operation indicated in FIG. 4 is accomplished. To the contrary, when such a completion of the GPS data measuring operation is not instructed, the process operation defined from the step S102 is repeatedly carried out.

On the other hand, when the CPU 34 judges that the travel speed is not the normal travel speed at the step S104, since this travel speed is greatly different from the actual travel speed of the user, if this largely-different travel speed is used as data which is directed to the average speed calculation executed at the step S106, then a large error will be involved in the average speed. As previously explained, such an abnormal travel speed is caused by the abnormal altitude/ longitude information extracted at the step S102. As a result, a travel distance calculated from this abnormal travel speed implies an incorrect distance value. If such an incorrect travel distance is used as data for accumulating travel distances at the step S105, then the accumulated travel distance also contains a large error.

As a consequence, in accordance with the first embodiment mode, in the case that the CPU 34 judges that the travel speed is not the normal travel speed at the step S104, both the travel distance and the travel speed, which are calculated at the step S102 and the step S103 respectively, are not employed as the data used to calculate the average speed and further to accumulate the travel distances. Therefore, the process operation is again returned to the previous step S102 at which another travel distance is calculated. In this case, the presently-extracted altitude/latitude information (namely, abnormal altitude/latitude information) at the step S102 is not used to update the previously-extracted altitude/ longitude information stored in the altitude/longitude information storage unit. As a result, the previously-extracted altitude/longitude information stored in the altitude/ longitude information storage unit has no change, such abnormal altitude/longitude information is not employed when a new travel distance is calculated.

As a consequence, in accordance with the portable type distance/speed meter of this embodiment mode 1, the travel distance, travel speed and average travel speed of the user are calculated by way of the positional change calculating method in response to the GPS electromagnetic waves acquired by the GPS receiver 31. When the calculated travel speed does not indicate the normal travel speed, the CPU 34 judges that either a so-called "positional jump" happens to occur or this portable type distance/speed meter is brought into the unreceivable condition. Thus, this abnormal travel speed and the travel distance corresponding to this abnormal travel speed are excluded from the subject GPS data used to accumulate the travel distances and also to calculate the average travel speed. As a result, this portable type distance/ speed meter can provide the accumulated distance and the average speed with respect to the user while maintaining more correct values and higher reliabilities.

Arrangement of Second Portable Type Distance/ Speed Meter

Next, a description will now be made of an arrangement of a portable type distance/speed meter according to an embodiment mode 2 of the present invention. It should be noted that the portable type distance/speed meter according to this embodiment mode 2 has similar structural elements to those shown in FIG. 3, namely, a GPS receiver 31, an input switch 32, an OSC 33, a CPU 34, a RAM 35, a ROM 36, a display panel 37, and an LCD driving circuit 38. Accordingly, detailed descriptions of these structural elements are omitted in this embodiment mode 2. However, various sorts of calculating process operations executed by this CPU 34 are different from those of the CPU 34 provided in the first portable type distance/speed meter.

In other words, as previously explained, according to the first-mentioned portable-type distance/speed meter of the embodiment mode 1, both the average travel speed and the accumulated travel distance are calculated, while excluding the travel speed and the travel distance when the "positional jump" is detected. In contrast, according to this portable type distance/speed meter of the embodiment mode 2, when a so-called "positional jump" is detected, a method for calculating a travel speed is switched from the positional change calculating method into the above-described Doppler speed calculating method. Then, both an average travel speed and an accumulated travel distance are calculated by employing a travel speed and a travel distance, which are calculated by this Doppler speed calculating method.

Operation of Second Portable Type Distance/Speed Meter

Figure 5:
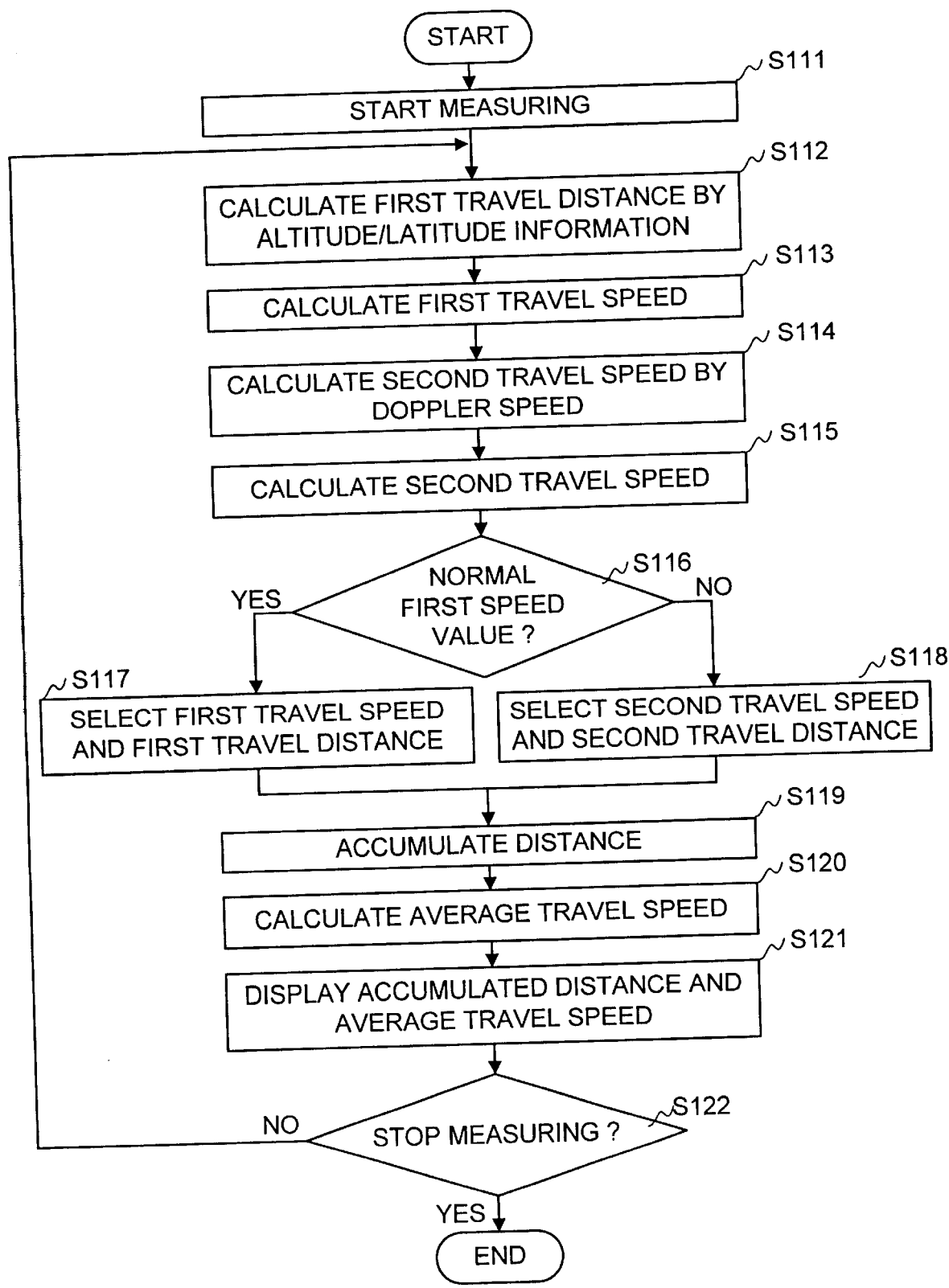
FIG. 5 is a flow chart describing operations of a portable type distance/speed meter according to an embodiment mode 2.

Operation of the above-described portable type distance/ speed meter according to this embodiment mode 2 will now be explained. FIG. 5 is a flow chart describing the operation of this second portable type distance/speed meter. In this flow chart of FIG. 5, since process operations defined from a step S111 to a step S113 correspond to those defined from the step S101 to the step S103 of FIG. 4, descriptions thereof are omitted in this second embodiment mode. In particular, as to the flow chart of FIG. 5, a travel speed and a travel distance, which are calculated based upon the positional change calculating method, will be referred to as a "first speed" and a "first distance", whereas a travel speed and a travel distance, which are calculated based upon the Doppler speed calculating method, will be referred to as a "second speed" and a "second distance".

Figure 2:
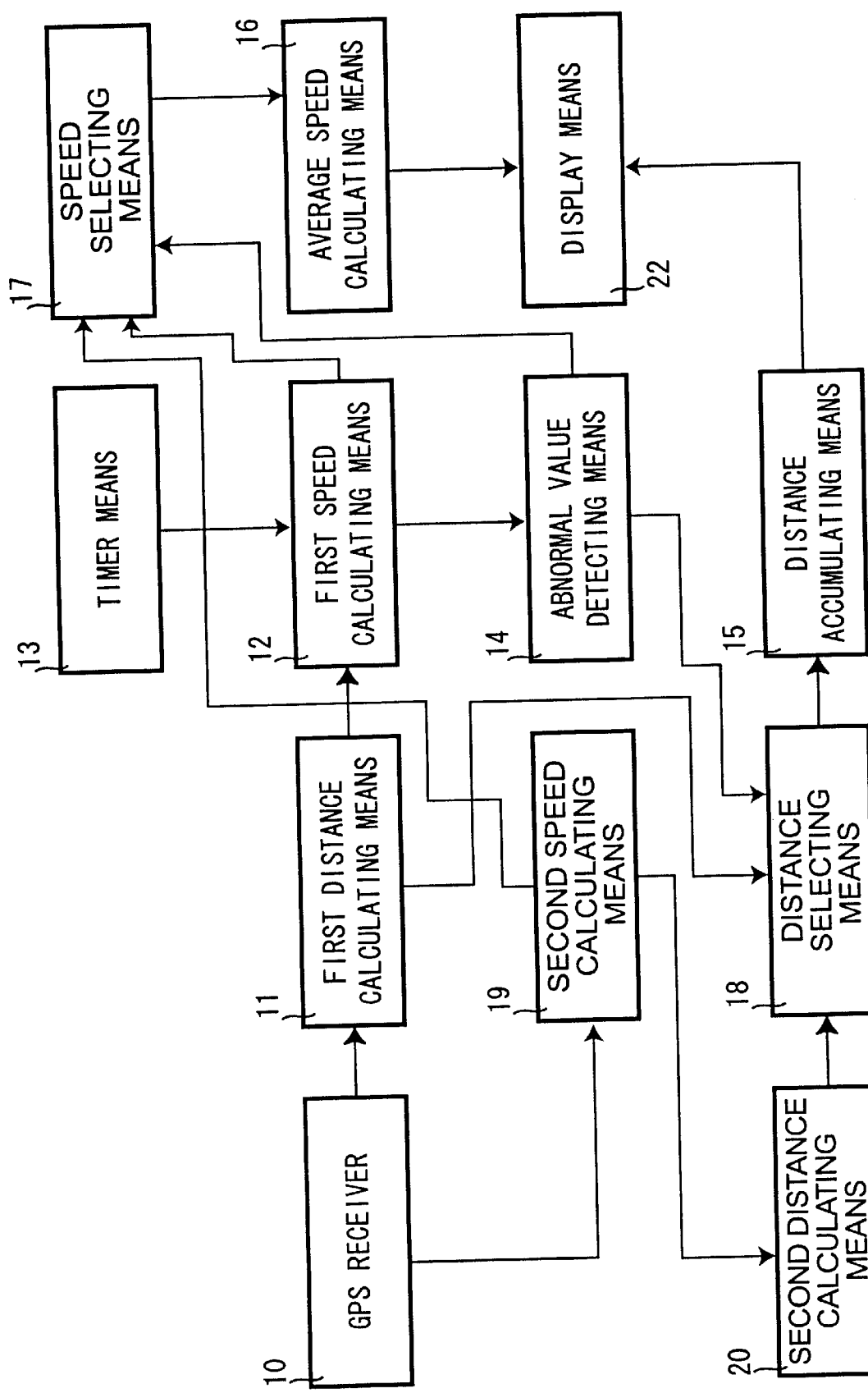
FIG. 2 is a block diagram schematically showing a principle arrangement of another portable type distance/speed meter according to the present invention.

After the process operation defined at the step S113 is accomplished, as previously explained, a travel speed (corresponding to "second speed") is calculated from the positioning data acquired by the GPS receiver 31 in accordance with the Doppler speed calculating method at a step S114. Then, a travel distance (corresponding to "second distance") of the user is calculated by accumulating this second speed at a step S115. Concretely speaking, this travel distance is calculated as follows. That is, the CPU 34 executes a time counting operation for a predetermined time period by employing a timer counter corresponding to the timer means 13 shown in FIG. 2, and then, this travel distance is calculated by multiplying the travel speed calculated by the Doppler shift by this predetermined time period counted by the time counting operation.

Subsequently, similar to the step S104 of FIG. 4, the CPU 34 judges as to whether or not the first speed calculated at the step S113 is the normal speed value (step S116). In other words, the CPU 34 detects as to whether or not a so-called "positional jump" happens to occur (namely, problem related to positional change calculating method).

In the case that the CPU 34 judges that the first speed corresponds to the normal travel speed at the step S104, both the first speed and the first distance are selected as calculation subjects of an average speed and an accumulated distance (will be discussed later). At the same time, similar to the process operation executed at the step S105 of FIG. 3, the previously-acquired altitude/latitude information saved in the altitude/latitude information storage unit is updated by the presently-acquired altitude/latitude information extracted at the step S112 in the manner as explained in the embodiment mode 1 (step S117).

On the other hand, when the CPU 34 judges that the first speed is not the normal travel speed at the step S116, since this first speed calculated by the positional change calculating method is greatly different from the actual travel speed of the user, if this largely-different first speed is used as data which is directed to an average speed calculation (will be explained later), then a large error will be involved in the calculated average speed. As previously explained, such an abnormal travel speed is caused by the abnormal altitude/longitude information extracted at the step S112. As a result, a travel distance calculated from this abnormal travel speed implies an incorrect distance value. If such an incorrect first distance is used as data for accumulating travel distances, then the accumulated travel distance also contains a large error. As a consequence, a highly reliable calculation result can be obtained by employing both the second speed and the second distance (calculated at the steps S114 and S115) as subject data used to calculate an average speed and an accumulated distance instead of the employment of these first speed and first distance. As a result, in this case, both the second speed and the second-distance are selected as the subject data used to calculate the average speed and the accumulated distance (will be discussed later).

Then, while the travel speed and the travel distance, which are selected at either the step S117 or the step S118, are employed, the CPU 34 accumulates the distances at a step S119, calculates an average speed at a step S120, and also displays the accumulated distance/average speed at a step S121. It should be noted that these steps S119 to S121 correspond to the steps S105 to S107 indicated in the flow chart of FIG. 4, explanations thereof are omitted.

After the process operation defined at the step S121 is accomplished, the CPU 34 judges as to whether or not the user manipulates the input switch 32 to instruct a completion of this GPS data measuring operation (step S122). At the step S122, when the completion of this GPS data measuring operation is instructed, a series of the above-described process operation indicated in FIG. 5 is accomplished. To the contrary, when such a completion of the GPS data measuring operation is not instructed, the process operation defined from the step S112 is repeatedly carried out.

As a consequence, in accordance with the portable type distance/speed meter of the embodiment mode 2, both the first distance and the first speed are calculated based upon the GPS electromagnetic waves transmitted from the GPS receiver 31 by way of the positional change calculating method, and furthermore, both the second distance and the second speed are calculated based on these GPS electromagnetic waves by way of the Doppler speed calculating method. In such a case that the calculated first speed indicates the normal travel speed value, both the average travel speed and the accumulated distance of the user are calculated by employing the first distance and the first speed. To the contrary, when the calculated first speed does not represent the normal travel speed value, the CPU judges that a so-called "positional jump" happens to occur, and therefore, both the average travel speed and the accumulated distance of the user are calculated by employing both the second distance and the second speed. As a result, the portable type distance/speed meter of the embodiment mode 2 employs both the positional change calculating method that is suitable for measuring the travel speed and the travel distance while the user walks, or runs and the Doppler speed calculating method that prevents the problem related to this positional change calculating method, even when such a positional jump happens to occur, so that this portable type distance/speed meter can continuously perform the precise GPS positioning operation, and also can provide the highly reliable accumulated distance as well as average speed with respect to the user.

It should be understood that the above-explained portable type distance/speed meters according to the embodiment modes 1 and 2 may be preferably used as a wrist watch mounted on a human body. More specifically, when a marathon runner is equipped with a distance/speed meter, these portable type distance/speed meters may be employed as an optical training meter. Accordingly, these portable type distance/speed meters may measure a travel speed and a travel distance by inputting lap time by the input switch 32.

As previously described in detail, in accordance with the portable type distance/speed meter of the present invention, the travel distance, and the travel speed of the user are calculated by way of the positional change calculating method in response to the GPS electromagnetic waves acquired by the GPS receiver. When the calculated travel speed indicates the abnormal travel speed value, the CPU judges that either a so-called "positional jump" (caused by the positional change calculating method) happens to occur or this portable type distance/speed meter is brought into the GPS data unreceivable condition. Thus, this abnormal travel speed and the travel distance calculated from this abnormal travel speed are excluded from the subject GPS data used to accumulate the travel distances and also to calculate the average travel speed. As a result, this portable type distance/speed meter can provide the accumulated distance and the average speed with respect to the user while maintaining more correct values and higher reliabilities.

Also, in accordance with the portable type distance/speed meter of the present invention, both the first distance and the first speed are calculated based upon the GPS electromagnetic waves transmitted from the GPS receiver by way of the positional change calculating method, and furthermore, both the second distance and the second speed are calculated based on these GPS electromagnetic waves by way of the Doppler speed calculating method. In such a case that the calculated first speed does not indicate the abnormal travel speed value, both the average travel speed and the accumulated distance of the user are calculated by employing the first distance and the first speed. To the contrary, when the calculated first speed represents the abnormal travel speed value, the CPU judges that a so-called "positional jump" (caused by the positional change calculating method) happens to occur, and therefore, both the average travel speed and the accumulated distance of the user are calculated by employing both the second distance and the second speed. As a result, the portable type distance/speed meter of the present invention employs both the positional change calculating method that is suitable for measuring the travel speed and the travel distance while the user walks, or runs and the Doppler speed calculating method that prevents the problem related to this positional change calculating method, even when such a positional jump happens to occur, so that this portable type distance/speed meter can continuously perform the precise GPS positioning operation, and also can provide the highly reliable accumulated distance as well as average speed with respect to the user.

What is claimed is:

1. A portable distance/speed meter that may be carried by a user, comprising:
    a GPS (Global Positioning System) receiver for receiving GPS electromagnetic waves transmitted from GPS satellites and acquiring positioning data from the received GPS electromagnetic waves;
    first distance calculating means for calculating a travel distance of the user between two different positions as a first distance based upon a difference between positional information contained in the positioning data acquired at the two positions;
    timer means for measuring travel time of the user over the first distance;

first speed calculating means for calculating a travel speed of the user as a first speed based upon both the first distance calculated by the first distance calculating means and the travel time measured by the timer means;

abnormal value detecting means for detecting an abnormal value of the first speed calculated by the first speed calculating means, the abnormal value being a calculated speed value larger than that which the user can travel;

average speed calculating means for calculating an average travel speed of the user based upon first speed values calculated by the first speed calculating means excluding abnormal values of the first speed detected by the abnormal value detecting means; and distance accumulating means for accumulating the first distance calculated by the first distance calculating means so as to calculate an accumulated distance excluding first distance values corresponding to abnormal values of the first speed detected by the abnormal value detecting means.

2. A portable distance/speed meter that may be carried by a user, comprising:

a GPS (Global Positioning System) receiver for receiving GPS electromagnetic waves transmitted from GPS satellites and acquiring positioning data from the received GPS electromagnetic waves;

first distance calculating means for calculating a travel distance of the user between two different positions as a first distance based upon a difference between positional information contained in the positioning data acquired at the two positions;

second speed calculating means for calculating a travel speed of the user as a second speed based upon Doppler shift frequency information contained in the positioning data;

timer means for measuring a first travel time of the user over the first distance and a second travel time of the user at the second speed;

first speed calculating means for calculating a travel speed of the user as a first speed based upon both the first distance calculated by the first distance calculating means and the first travel time measured by the timer means;

second distance calculating means for calculating a travel distance of the user as a second distance based upon both the second speed calculated by the second speed calculating means and the second travel time measured by the timer means;

abnormal value detecting means for detecting an abnormal value of the first speed calculated by the first speed calculating means, the abnormal value being a calculated speed value larger than that which the user can travel;

speed selecting means for selecting the first speed when the abnormal value of the first speed is not detected by the abnormal value detecting means, and for selecting the second speed when the abnormal value of the first speed is detected by the abnormal value detecting means;

distance selecting means for selecting the first distance when the abnormal value of the first speed is not detected by the abnormal value detecting means, and for selecting the second distance when the abnormal value of said first speed is detected by the abnormal value detecting means;

average speed calculating means for calculating an average travel speed of the user by employing the selected one of the first speed and the second speed selected by the speed selecting means; and distance accumulating means for calculating an accumulated distance by employing the selected one of the first distance and the second distance selected by the distance selecting means.

3. A portable distance/speed meter as claimed in claim 1 or claim 2; wherein the abnormal value detecting means compares a present speed value of the first speed with a preceding speed value thereof, which are calculated by the first speed calculating means, and detects the first speed as being an abnormal value when the first speed corresponding to the present speed value varies by more than a predetermined amount from the first speed corresponding to the preceding speed value.

4. A portable distance/speed meter that may be carried by a user, comprising:

a GPS (Global Positioning System) receiver for receiving GPS electromagnetic waves transmitted from GPS satellites and acquiring positioning data from the received GPS electromagnetic waves;

a first distance calculating circuit for calculating a travel distance of the user between two different positions as a first distance based upon a difference between positional information contained in the positioning data acquired at the two positions;

a timer for measuring travel time of the user over the first distance;

a first speed calculating circuit for calculating a travel speed of the user as a first speed based upon both the first distance calculated by the first distance calculating circuit and the travel time measured by the timer;

an abnormal value detecting circuit for detecting an abnormal value of the first speed calculated by the first speed calculating circuit, the abnormal value being a calculated speed value larger than that which the user can travel;

an average speed calculating circuit for calculating an average travel speed of the user based upon first speed values calculated by the first speed calculating circuit excluding abnormal value of the first speed detected by the abnormal value detecting circuit; and a distance accumulating circuit for accumulating the first distance calculated by the first distance calculating circuit so as to calculate an accumulated distance excluding first distance values corresponding to abnormal values of the first speed detected by the abnormal value detecting circuit.

5. A portable distance/speed meter according to claim 4; wherein the abnormal value detecting circuit compares a present first speed value with a preceding calculated first speed value and determines that the present first speed value is an abnormal value when it varies from the preceding first speed value by more than a predetermined amount.

6. A portable distance/speed meter that may be carried by a user, comprising:

a GPS (Global Positioning System) receiver for receiving GPS electromagnetic waves transmitted from GPS satellites and acquiring positioning data from the received GPS electromagnetic waves;

a first distance calculating circuit for calculating a travel distance of the user between two different positions as a first distance based upon a difference between positional information contained in the positioning data acquired at the two positions;

a second speed calculating circuit for calculating a travel speed of the user as a second speed based upon Doppler shift frequency information contained in the positioning data;

a timer for measuring a first travel time of the user over the first distance and a second travel time of the user at the second speed;

a first speed calculating circuit for calculating a travel speed of the user as a first speed based upon both the first distance calculated by the first distance calculating circuit and the first travel time measured by the timer;

a second distance calculating circuit for calculating a travel distance of the user as a second distance based upon both the second speed calculated by the second speed calculating circuit and the second travel time measured, by the timer;

an abnormal value detecting circuit for detecting an abnormal value of the first speed calculated by the first speed calculating circuit, the abnormal value being a calculated speed value larger than that which the user can travel;

a speed selecting circuit for selecting the first speed when the abnormal value of the first speed is not detected by the abnormal value detecting circuit, and for selecting the second speed when the abnormal value of the first speed is detected by the abnormal value detecting circuit;

a distance selecting circuit for selecting the first distance when the abnormal value of the first speed is not detected by the abnormal value detecting circuit, and for selecting the second distance when the abnormal value of the first speed is detected by the abnormal value detecting circuit;

an average speed calculating circuit for calculating an average travel speed of the user by employing the selected one of the first speed and the second speed selected by the speed selecting circuit; and a distance accumulating circuit for calculating an accumulated distance by employing the selected one of the first distance and the second distance selected by the distance selecting circuit.

7. A portable distance/speed meter according to claim 6; wherein the abnormal value detecting circuit compares a present first speed value with a preceding calculated first speed value and determines that the present first speed value is an abnormal value when it varies from the preceding first speed value by more than a predetermined amount.

8. A portable distance/speed meter comprising: a receiver for receiving GPS signals and acquiring positioning data therefrom; and a processing circuit for processing the positioning data to determine a first distance value traveled by a user between two locations corresponding to sequentially received GPS signals, calculating a speed of the user while traveling between the two locations by a first method comprising an arithmetic method based on the positioning data corresponding to the two locations and a traveling time of the user between the two locations and a second method comprising a Doppler shift frequency method, determining abnormal values comprising speed values calculated by the first method which vary from a preceding calculated speed value by more than a predetermined amount, substituting speed values calculated by the second method for abnormal values, and calculating at least one of an accumulated distance traveled by the user by adding first distance values and an average speed of the user by adding calculated speed values and taking into account substituted speed values in determining the accumulated distance or average speed.

9. A portable distance/speed meter according to claim 8; wherein the processing circuit calculates an average speed of the user by averaging speed values calculated based on first distance values, and excluding abnormal values of the calculated speed.

* * * * *